May 17, 1960 N. K. ACKER 2,937,026

PHONOGRAPH RECORD PLAYERS

Filed Feb. 2, 1954 5 Sheets-Sheet 1

Inventor:
NORBERT K. ACKER
BY [signature]
ATTORNEY

May 17, 1960 N. K. ACKER 2,937,026

PHONOGRAPH RECORD PLAYERS

Filed Feb. 2, 1954 5 Sheets-Sheet 2

Inventor:
NORBERT K. ACKER
By [signature]
ATTORNEY

May 17, 1960 N. K. ACKER 2,937,026

PHONOGRAPH RECORD PLAYERS

Filed Feb. 2, 1954 5 Sheets-Sheet 3

Inventor:
NORBERT K. ACKER
BY [signature]
ATTORNEY

May 17, 1960 N. K. ACKER 2,937,026

PHONOGRAPH RECORD PLAYERS

Filed Feb. 2, 1954 5 Sheets-Sheet 4

Inventor:
NORBERT K. ACKER
By [signature]
ATTORNEY

May 17, 1960 N. K. ACKER 2,937,026

PHONOGRAPH RECORD PLAYERS

Filed Feb. 2, 1954 5 Sheets-Sheet 5

Inventor:
NORBERT K. ACKER
By [signature]
ATTORNEY

United States Patent Office 2,937,026
Patented May 17, 1960

2,937,026

PHONOGRAPH RECORD PLAYERS

Norbert K. Acker, Offenbach (Main), Germany

Application February 2, 1954, Serial No. 407,663

Claims priority, application Germany February 10, 1953

10 Claims. (Cl. 274—10)

This invention relates to phonograph record players in which individual records are selected from a plurality of records in a magazine, moved into playing position and, after playing, are returned into their initial position in the magazine. Devices of this kind are usually of the coin-freed type and they are provided, broadly, apart from the said magazine with a selecting device for choosing any desired record and moving or holding it in a picking-up position, a lifting mechanism which lifts the selected record from the magazine and turns it into position for playing, and with a playing device which causes the record to be played, following which it is returned to its initial position usually by a reversed motion of the lifting device.

The invention, further, has particular reference to that type of phonograph record players in which the records are stored in upright position and selectively moved in between a pair of lifting arms by means of which they are transferred into a position in which they are acted upon by the stylus of a swingably mounted tone armature.

Devices of the said kind are complicated and costly, particularly when they are arranged to play both sides of the records and, owing to their complicated nature, are subject to frequent breakdowns. It is, therefore, a primary object of the invention to simplify the construction and arrangement of such devices, to lessen their costs, and to render theme more reliable in operation.

Another very important object of the invention rests in a material simplification of the selecting device which, according to the invention, will be provided with one single selector element to pick out any desired record from any number of records in the magazine or other store, which shall be rotatable, preferably by the assistance of a magazine stopping device in the shape of a stationary pin wheel, and to place it in a position from which it can be taken up by the lifting device.

Another object of the invention is the provision, in a phonograph record playing device, of a selecting device which shall permit both sides of a record to be played at choice without thereby entailing any special mechanical or other means beyond the contrivance which would have to be used if only one side of the record would have to be played.

Still another object is the provision of means in connection with a turnable record store plate for stopping the plate at always the correct position with the selected record opposite the lifting device irrespective of the side of the record which is intended to be played.

A further object of the invention is the provision of simplified and improved means for lifting the selected record into a playing position in about the middle of the record player and for moving it into contact with a record carrier in such a manner that it can be played in a vertically upright position above the other records on the store plate as contrasted with the usual method of playing phonograph records in horizontal position.

Yet another object of the invention rests in the employment of a preferably reversible motor for moving, playing and returning the selected record whereby, in order to keep the motor as small as possible, the actual lifting will be assisted by appropriately applied tension springs under the control of the motor rotating in one direction, while for lowering the records the force of the springs is gradually relieved under the control of the motor rotating in the other direction.

With these and other objects in view the invention broadly consists in the provision, in a phonograph record player of the aforesaid type, of a selecting, lifting and playing device in which the records are stored in a radially star-like arrangement on a store plate adapted to revolve about a vertical axis and from which the selected records are lifted to a position in about the centre of the store plate above the other records on the said plate, to be rotated and played there about a horizontal axis. Means are provided in accordance with the invention, including a novel type of clutch between the playing motor and a record carrier, to enable the various movements of the parts to be effected in a simple and reliable manner and so that selectively either side of the record may be selected and played, and the record eventually returned into its initial position.

Although in accordance with the invention the arrangement of the parts and groups of mechanism is such as to cooperate with each other in a perfect working sequence, it is also possible to use any of the said groups in connection with other devices of a similar kind, or to refrain from incorporating some of the improvements in the device herein referred to.

The invention will now be more fully described with reference to the accompanying diagrammatic drawings in which a preferred embodiment of the invention is illustrated. It is to be understood that the showing is by way of example only and that various alterations and modifications may be resorted to within the meaning of the invention as described and pointed out in the claims at the end of this specification.

Figure 1:
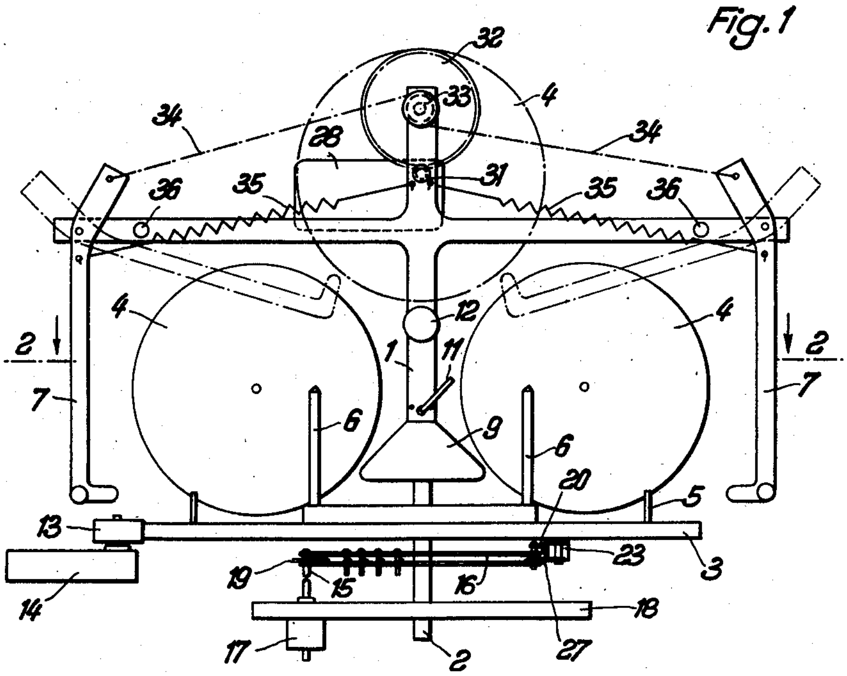
Fig. 1 is a diagrammatic front elevation of a phonograph record player in accordance with the invention.

Referring to Fig. 1 the numeral 1 denotes a standard or column which forms part of the frame of the improved record player and which, at its lower end, terminates into a stationary shaft or bearing pin 2 carrying a revoluble plate 3 upon which the phonograph records 4 to be played are stored and which, for that reason, will hereinafter be referred to as "store plate" or turntable. This store plate supports the said records 4 upright on V-shaped blocks 5 and between preferably resilient rods 6 radially star-fashioned in such a manner, that the extended horizontal diameter of each record passes through the gap between two records on the opposite side of the record plate. The store plate 3 receives its rotary motion by a friction wheel 13 which is driven from a reversible motor 14.

Below the store plate 3 and stationary on the shaft 2 is a pin wheel 16, around the circumference of which a plurality of depending pins 15 are arranged which are able to move freely up and down in perforations of the said pin wheel. Normally, however, the said pins, or selecting pins 15 as they will be called hereinafter, depend downwardly being held by their heads on the upper surface of the pin wheel. Springs 19 are provided (Fig. 6) to maintain the said pins in position by friction. The number of the pins conforms to the number of the records on the store plate 3 inasmuch as each particular pin pertains to one certain record and no other.

Figure 2:
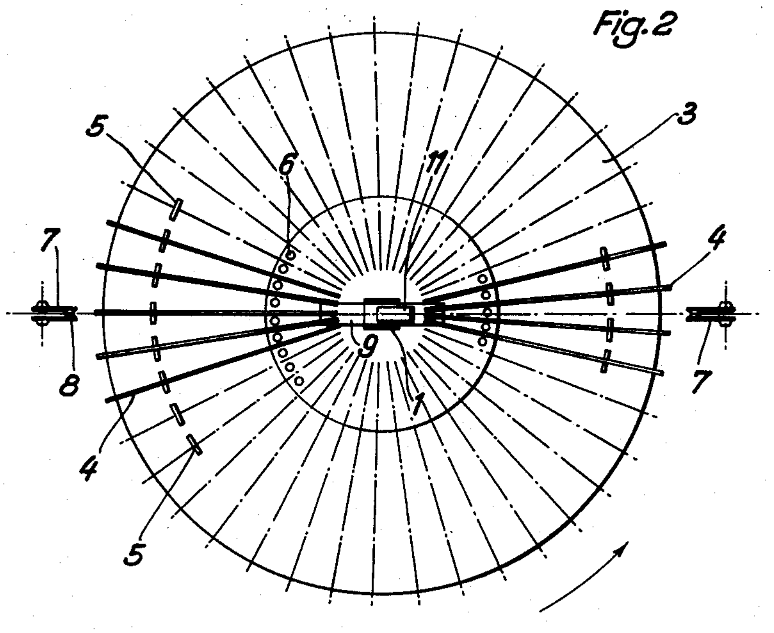
Fig. 2 represents a top view of the store plate and is a section on line 2—2 of Fig. 1.

Below the stationary pin wheel 16 and also arranged on the shaft 2 is a selector plate 18 which is preferably turnable by hand and provided with a solenoid 17. If a certain record is to be selected for playing, the selector plate 18 is turned so that the protruding core of the solenoid 17 takes its position underneath that pin 15 which conforms to the record which is desired to be played and of which the title or number will have to be made visible outside in any known or convenient manner. By a contact, which may be closed by the action of a coin dropped into a slot (not shown), the solenoid becomes energised and pushes the pin 15 of the selected record up so that its head becomes raised above the rest of the pins, as indicated on the right hand side of the pin wheel in Fig. 1. In this position the pin will be held by the frictional pressure of its spring 19 already referred to. At the same time with the pushing up of the pin 15 the motor 14 receives current and the friction wheel 13 begins to revolve the store plate 3 in the direction of the arrow shown in Fig. 2.

It will have to be explained at this juncture that all records which are stored on the store plate 3 may be played on both sides. The position from which the records are lifted in a manner still to be described, is denoted in Fig. 2 by the two arms 7 shown in section and the central dot-and-dash line connecting them. If for instance the front 4*a* of any record has been selected, the store plate 3, by its rotation, will carry the selected record to the position of the dot-and-dash line just referred to on the right hand side of Fig. 2. If the back 4*b* is desired, rotation has to be continued as far as to the opposite arm 7 on the left hand side of Fig. 2. In this way the record to be played will always show that side to the front which is desired to be played.

Figure 7:
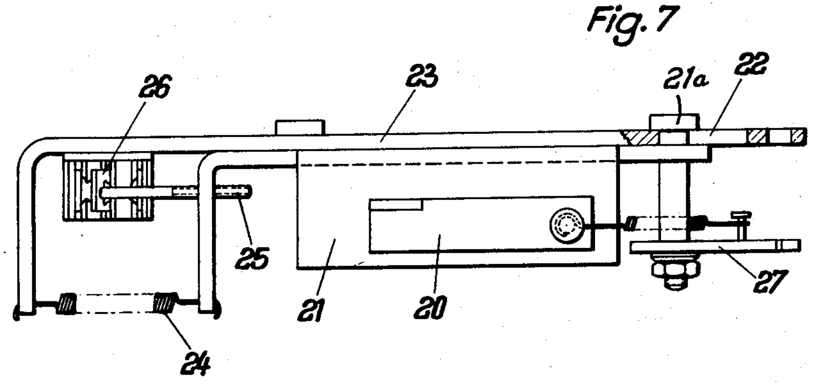
Fig. 7 is a front elevation of parts shown in Fig. 6.
Figure 6:
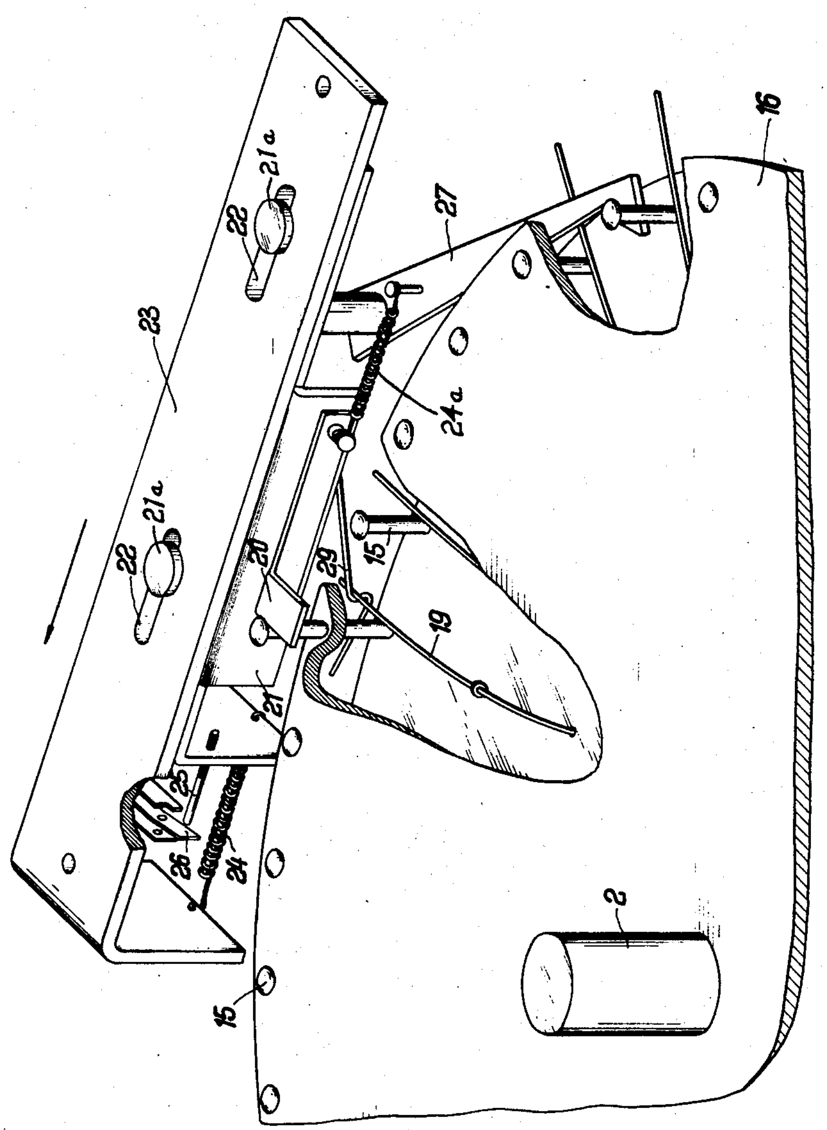
Fig. 6 represents an enlarged perspective view of the device for the location of the selected record.

Provided on the lower side of the store plate 3 is a mechanism which comprises a bracket 23 (Fig. 6) which is disposed tangentially to the stationary pin wheel 16 and which is provided with slots 22, through which the bolts 21*a* of a slide member 21 are passed so as to allow of a limited movement of the said slide in relation to the bracket 23 as initiated by the store plate 3 and indicated by the arrow in Fig. 6. At its front end the slide 21 carries a projection or flap 20. Slide 21 is urged by a spring 24 in the direction of a depending arm on the left hand side of the bracket 23, while the projection 20 is connected to another spring 24*a* on the other side of the bracket. The spring 24, in its tendency to draw the slide 21 toward the depending arm of the bracket 23, causes a switch or contact pin 25 to maintain the change-over contact 26 in operative position. If now the projection 20, during the rotation of the store plate 3 by the motor 14 encounters a raised selecting pin 15, the slide 21 will be held back by the said pin, while the plate 3 continues to rotate until the change-over contact 26 has moved away from the contact pin 25 sufficiently far as to become disengaged and to take a position of rest. This causes a relay to attract its armature which acts on the motor 14 so as to reverse its direction of rotation. Simultaneously therewith an electric resistance becomes connected into the circuit, which throttles the motor to such an extent, that under the now occurring return movement of the store plate 3 the stop pawl 27, which is pivoted at the end of the slide 21, contacts only softly with its nearest pin 15, so that the disk 3 comes to rest without a shock. Normally the slide 21 assumes a position to the left of the bracket whereby the studs 21*a* rest against the left ends of the slots 22 as shown in Fig. 7, but when the projecting flap 20 catches on a raised pin 15, the studs 21*a* and therewith the slide 21 move to the right as in Fig. 6.

By the movement which has just been described the slide 21 resumes its original position and the change-over switch 26 again takes up its operating position. Hereby a second relay becomes attracted which starts the playing motor 28. The aforementioned return motion also causes the spring 19 of the raised pin 15 to be withdrawn by the release spring 29 on slide 21, whereupon the pin 15 drops down into its original position on the pin wheel 16.

The aforementioned playing motor 28 performs four different functions, namely: It first causes the selected record 4 to be lifted up to a position above the other records on the store plate 3, whereupon it locates the record into its proper playing position, it then causes it to be played, and eventually reverses and thereby returns the record into its original position.

Lifting of the arms 7 is effected by means of the springs 35 which are fastened with their innermost ends to the standard of the device and with their outermost ends to the pivoted lifting arms 7. Preferably the motor 28 acts over a worm gear (not shown) serving as a speed reduction gear which, when reversed from the gear shaft to the motor armature, acts to block the worm. In this way it is ensured that in the position of rest of the arms 7 the tension springs 35 are indirectly held in tension by the motor 28 when the latter has been set to rest.

In operation, a record 4 is selected and moved into the position for being raised, with the projection 20 on the slide 21 having brought the store plate to a stillstand as has been described above with reference to Fig. 6. The lifting arms 7 are actuated by the springs 35 by the playing motor 28 through the pinion 31 (presently to be described), the rope pulley 33 and the cable 34 connected thereto. The motor rotates to the right and, owing to the interpositioned gear 31, 32, yields to the tension of the springs 35 so that the cable 34 unwinds from its pulley 33, thereby gradually releasing the springs, which are thus able to move toward each other and to carry out their lifting movement within the limit imposed to them by the stops 36 of the frame. The actual lifting of the record by the arms 7 will be described at a later stage.

Figure 3:
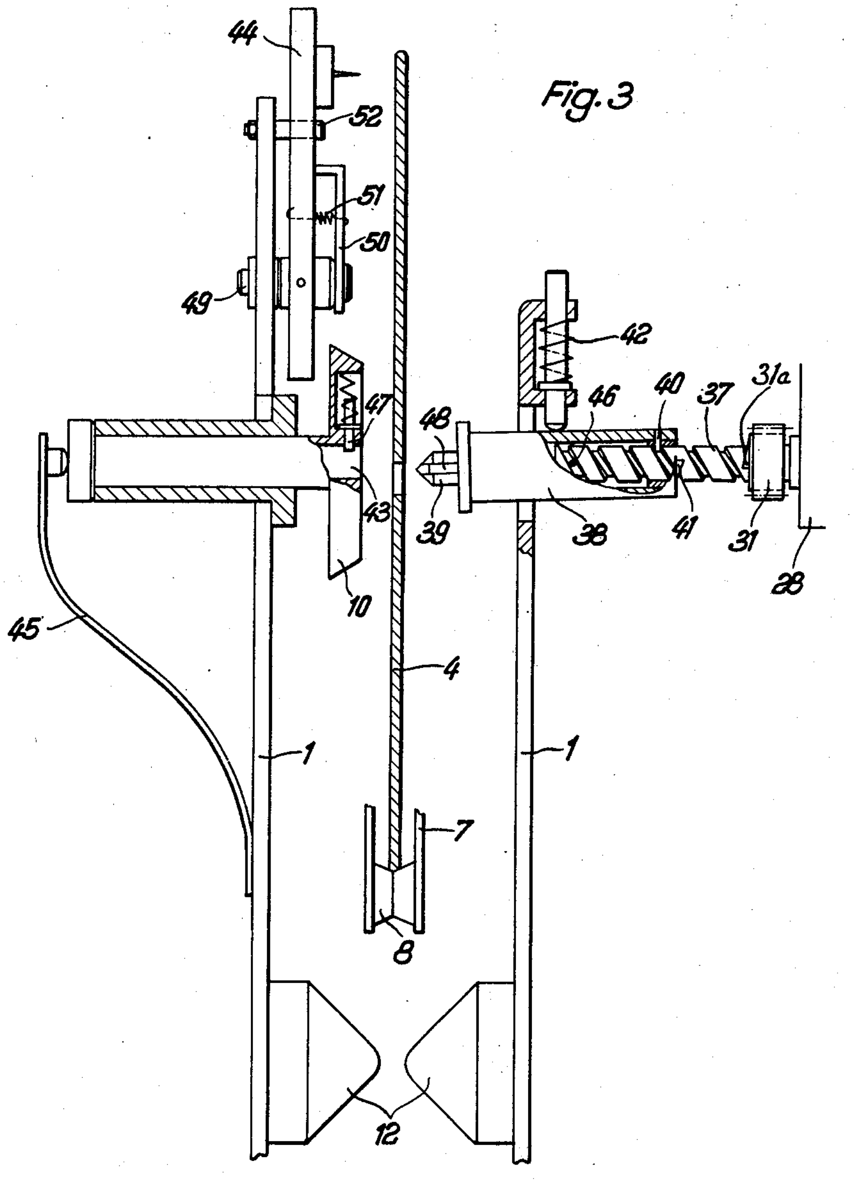
Fig. 3 is a fragmentary side elevation, partly in section, of the record centering and playing device with a record in its elevated position.
Figure 4:
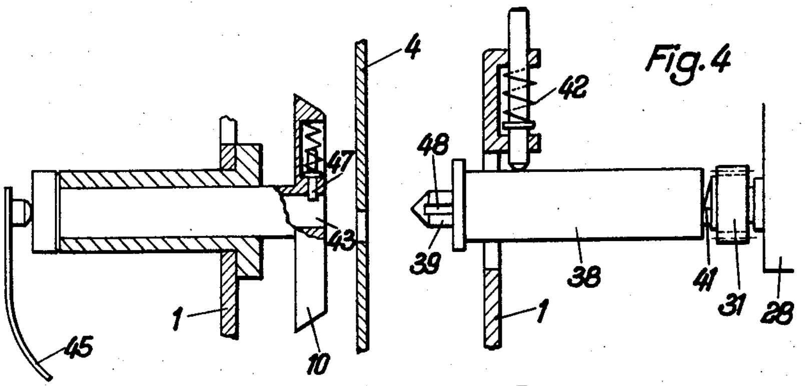
Fig. 4 is a section through the record shifting and turning means shown in Fig. 3 in their starting position.
Figure 5:
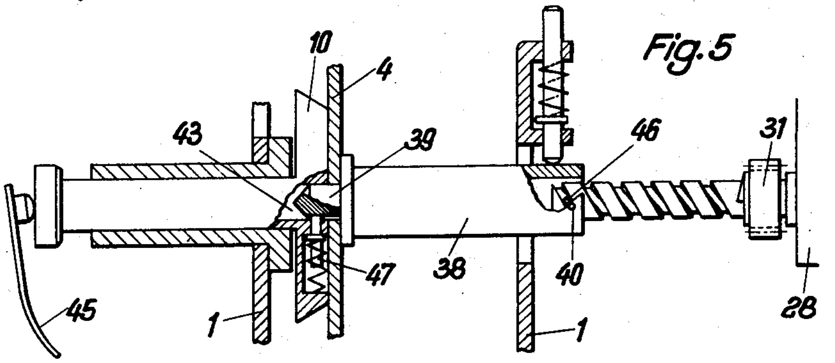
Fig. 5 illustrates the means shown in Fig. 4 in their working position.

Referring particularly to Figs. 3 to 5 it will be noted that the shaft of the playing motor 28 is extended and with its extended part forms a threaded spindle 37. The part of the spindle adjacent the motor is plain and carries the aforesaid pinion 31 loosely turnable upon it. Pushed over the threaded part of the spindle is a loosely fitting sleeve 38, which is closed at its forward end and provided with a center pin 39. At its other end the sleeve 38 is internally provided with a guide pin 40 which extends into the preferably square thread of the screw spindle 37 which, near its outer end, has fastened to it a fixed pin 46.

Prior to the beginning of the rotation of the playing motor 28 the parts take the position shown in Fig. 4. The pinion 31 and the sleeve 38 are held in mutual contact by a small dog clutch comprising the tooth 41 at the open end of the sleeve 38 and a countertooth 31*a* on the pinion 31. As long as the motor 28 is at standstill, pinion 31 will be held from rotation by this clutch, so that the cables 34 (Fig. 1) will not allow the lifting arms 7 to yield to the pull of the springs 35 as already explained. As soon, however, as the motor begins to turn to the right, sleeve 38 begins to move toward the left owing to its pin 40 travelling along the thread of the spindle 37 until stopped by the fixed pin 46 at the forward end of the screw spindle.

The movement of the sleeve 38 just described bears out two results. One of these results is the liberation of the pinion 31 which is now free to follow the draw of the springs 35 under control of the gear wheel 32, so that the lifting arms 7 move inwardly to raise the selected record into its upper playing position as shown in Fig. 1. The other result is the already referred-to travel of the sleeve 38 into the position shown in Fig. 5, in which the record 4 has been caused to ride up the centre pin 39 and to be pressed against a vertically disposed turntable or record carrier 10 (Figs. 3 to 5). This carrier is provided with a radial spring-pressed plunger 47 which, when the center pin 39 has entered into the central passage 43 of the record carrier 10 and begins to rotate, will spring into a notch 48 on the center pin and, thereby, become effective in rotating the record carrier 10 also. The selected record 4 is pressed between the carrier 10 and a flange on the sleeve 38 and in this way is caused to join in the rotation. A leaf spring 45 or the like is provided to exert an axial pressure on the shaft of the record carrier 10, so that the record is securely held at one side by the thrust of the spindle 37 and at the other side by the spring 45.

Fig. 3 illustrates the parts just referred to prior to the center pin 39 entering the central hole in the selected record 4. It will be seen that the record still rests on the lifting arms 7 which are preferably made in double formation with bosses 8 between them, and by means of which the records are taken up from their position on the store plate 3 and carried upwardly. Since the records on one side of the circle of vertically positioned records on the store plate must be moved upwards with the same reliability as those on the other side, the standard 1 of the apparatus is provided with a two-sided incline 9 (Fig. 1). When the lifting arms 7 begin their movement, first that arm adjacent the selected record will come into contact with the edge of the record by means of the bosses 8 and will roll it up the incline 9. In doing so the record actuates a pivoted flap 11 and turns it to the other side. This flap 11 acts as a switchback and ensures the return of the lifted record always to the same side from which it has been taken. Having entered the incline 11 the record assumes an approximately central position, in which it is caught up by the other lifting arm 7 also, whereupon both arms jointly continue to move the record past soft resilient pads 12 to the top position shown in Fig. 1. This is the position of which Fig. 3 is a sectional side elevation after the screw spindle 37 has moved the sleeve 38 part of its way toward the selected record.

As already referred to, sleeve 38 is a loose fit on the spindle 37. This serves the following purpose: In Fig. 3 the record 4 which is to be played, still rests on the bosses 8 of the lifting arm 7. In order to be played it must be raised from these bosses, and it is partly for this purpose that the plunger 42 is arranged on the standard 1 so as to press onto the sleeve 38. Owing to its loose fit on the extended shaft 37 the sleeve is thereby caused to take a slightly inclined position with respect to its horizontal axis. The central aperture in the record also lies slightly below the said horizontal axis, but in a position which will enable the pointed part of the centre pin 39 to enter through it on its way to the record carrier 10. The record 4, thereby, is caused to ride up the pin 39 and, as the pin eventually becomes centered in the bore 43 of the record carrier 10, is lifted off the bosses 8 so that it can be rotated after it has assumed the position shown in Fig. 5. It will be easily understood from this position in connection with Fig. 3 that with the entrance of the pin 39 and with the further advance of the sleeve 38 the record is moved into contact with the stylus of the tone arm to return automatically into its original driven; its requisite small turning moment is produced by weight or spring pressure in the direction of the adjustable stop 52. The purpose of this arrangement is to cause the tone arm to return automatically into its original position as soon as the stylus has left the sound groove of the record. When the record 4 is pressed against the tone arm 44, the latter is lifted off the angle piece 50 which is fast with the axle pin 49 of the tone arm, so that the bearing pressure of the stylus, as communicated by the spring 51, comes into action.

Another purpose of the spring-pressed plunger 42 is the following: When after the lifting of the record by the arms 7 the tension of the spring 35 is caught up by the stops 36 on the standard, so that the force of the coupling engagement between the pinion 31 and the centering sleeve 38 relaxes, the latter receives a thrust in the direction of the record carrier 10 because of its being subjected to a constant frictional pressure from the spring plunger 42, so that the latter will cause the sleeve 38 to follow the forward thrust of the spindle 37 rather than to take part in its rotation.

After the stylus of the tone arm 44 has entered the end spiral of the sound groove on the record, it opens a contact which acts over the aforesaid relay to reverse the direction of rotation of the motor 28, which causes the aforedescribed operations to take place in the reverse way. The record 4 moves away from the tone arm 44 and, after a short distance, when the centering sleeve 38 has returned part of its way, drops back onto the bosses 8 of the lifting arms 7 which have remained in the position of Fig. 3. Eventually the pinion 31 becomes coupled with the sleeve 38 over the teeth 41, 31*a* causing the cables 34 to wind up and to swing the lifting arms 7 into the position shown in full lines in Fig. 1, under the simultaneous tensioning of the springs 35. The record is thereby returned from its raised position, whereby the flap 11 serves as a switchback and causes the record to drop into the same cradle 5, 6 from which it has originally been lifted. The lifting arms, on reaching their original position, actuate a set of contacts by means of which the playing motor 28 is switched off and the store plate driving motor 14 turned on.

Figure 8:
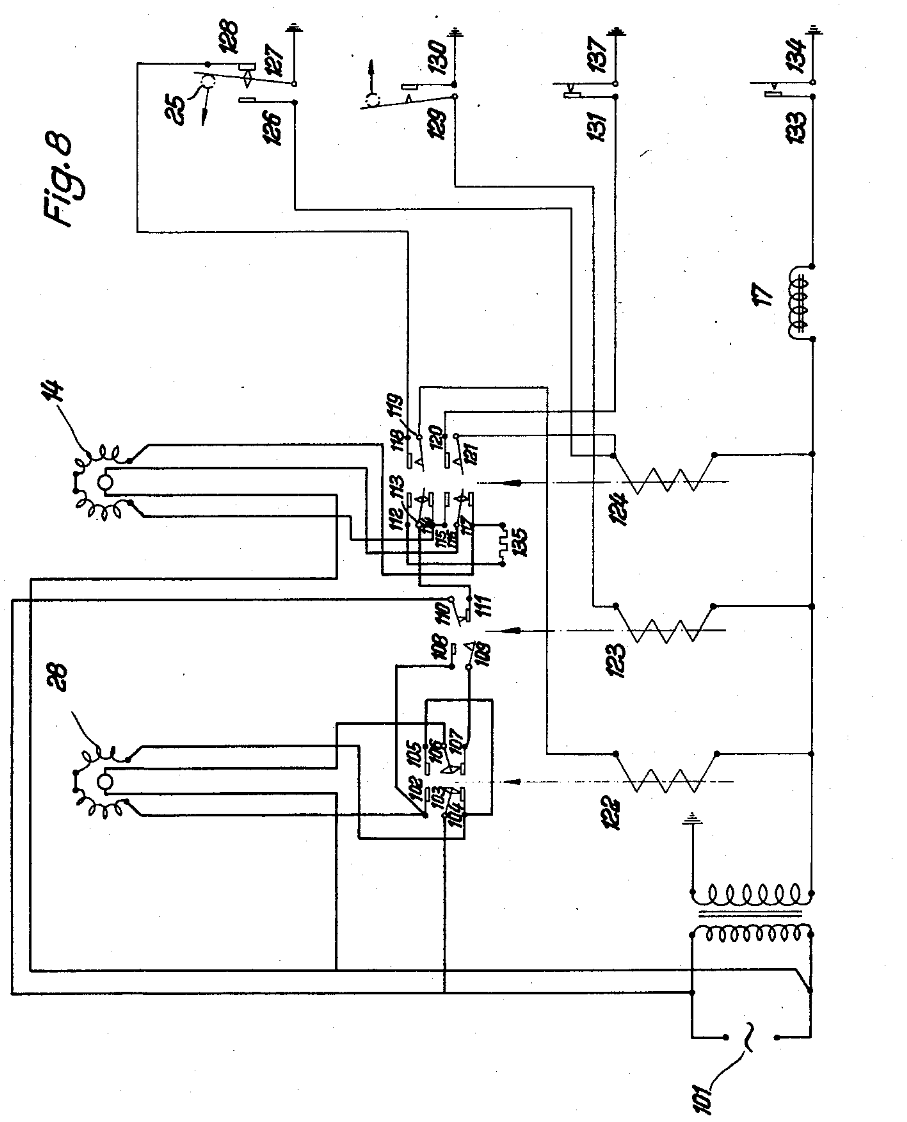
Fig. 8 is a wiring diagram.

Referring now to Fig. 8 of the drawings which illustrates a wiring diagram giving all the electric connections throughout a phonograph record player as has been described in the foregoing paragraphs. When connecting the device to the main at 101, motor 14 receives current over the contacts 110—111, 113—114, 116—117, and the store plate 3 begins to rotate. After the solenoid 17 has been located beneath a selecting pin 15 and the contacts 113—114 are closed, as by the dropping of a coin into a slot as is well known in devices of this type, the solenoid becomes energized, over two sliding contacts for instance, and the corresponding selecting pin 15 is pushed up.

Now, as soon as the projecting flap 20 which rotates with the disk 3 over the pins 15, encounters a raised pin, the following electric connections take place, in addition to the mechanical operations already described: The contact pin 25 of the slide 21 withdraws from contact 127; the contacts 126—127 close, supplying current to the relay 124 which becomes electrically locked over the contacts 121—120 and 131—137. Motor 14 now receives its current over the contacts 110—111, 113—112, the resistance 135, and contacts 115—116, and reverses. The store plate 3 then turns in the opposite direction until the pawl 27 becomes active to stop it. At the same time contact 127—128 is closed again, so that the relay 122 is provided with current over the contacts 127—128 and 118—119. Now the playing motor 28 receives current over the contacts 103—102 and 103—106. The now ascending lifting arms 7 release contact 129 and the relay 123 is placed into the circuit over the contacts 130—129. Contacts 110—111 open and thereby interrupt the circuit to the motor 14.

After the selected record has been played the returning tone arm 44 opens the contact 131—137, which releases the locking of relay 124 and interrupts the circuit to the relays 124 and 122. Motor 28 now receives current over the contacts 103—104, 108—109, and 107—106, and reverses. When the lifting arms 7 have returned into their starting position, contacts 129—130 are open and relay 123 is without current. The contact 108—109 which has been opened thereby, interrupts the flow of the current through the playing motor 28, simultaneously closing the circuit to the motor 14 over the contacts 110—111, so that the store plate 3 rotates again until its flap 20 comes into contact with another raised selecting pin 15, when the whole procedure hereinbefore described will be repeated.

What I claim is:

1. In a phonograph record player having a revoluble store plate rotatably mounted upon a shaft serving as a magazine for the records to be supported thereon in upright radially arranged position and a record selecting mechanism including a stationary pin wheel secured upon said shaft having individually slidable selecting pins, a slide carried upon said store plate for limited movement relative thereto having a stop member engageable with said pin for arresting said revoluble store plate in a position with a selected record in front of the position in which it is to be played, a record lifting mechanism comprising two oppositely disposed lifting arms, spring means for lifting the said arms and two cables for tensioning the said spring means so as normally to maintain them in their inoperative position, a winding-up mechanism for the said cables, a record playing mechanism including a tone arm, an electric motor to drive the said store plate and another electric motor to drive the selected record for playing, gear means in connection with the said record playing motor for operating the said winding-up mechanism, an electric change over switch on the said slide to disconnect the driving motor of the store plate and to connect the record playing motor for causing, prior to operating the playing mechanism, the lifting of a selected record by releasing the said spring means through unwinding the said spring means tensioning cables, thereby raising the lifting arms together with the selected record into playing position above the other records, and means for declutching the said gear means from the record playing motor by the reversal of the said record playing motor.

2. A photograph record player having a turntable for storing a plurality of records in upright position, a record selecting, a lifting and a playing mechanism including a record playing motor, said lifting mechanism comprising two vertically swingable record lifting arms, a standard centrally arranged on the record player, a cross member having arms to extend diametrically above the records on the turntable and pivotally supporting the said lifting arms at its ends, two tension springs each intermediate the said standard and one of said lifting arms, both springs unitedly and simultaneously urging the said lifting arms toward the circumference of a selected record to lift the same off the turntable to a position centrally above the other records, a cable pulley at the top of the standard, cables fixed to the said pulley and the said record lifting arms acting tension to return said arms toward a lowered position, gear means intermediate the said pulley and the record playing motor for rotating the said pulley to tension said cables, and means for declutching the said gear means from the record playing motor a predetermined period of time after the completion of the lifting action by the reversal of the said record playing motor, thereby to control over the said cable and springs, the record lifting and lowering action of the said lifting arms.

3. A phonograph record player having a turntable for storing a plurality of records in radially upright position, a record selecting, a lifting and a playing mechanism including a record playing motor and gear means for reversing the direction of rotation of the said motor, said lifting mechanism comprising a standard arranged centrally on the record player, a cross piece at approximately the upper end of said standard having its arms extending diametrically above the records on the turntable, two pairs of cooperating vertically swingable record lifting arms, each one pair being pivoted to an outer end of the said arms of the cross piece for lifting the selected record to a position centrally above the other records on the turntable, each of the said pairs of lifting arms comprising a short upper and a long lower arm, protruding bosses at the ends of each of said longer arms contacting with each other jointly to support a record during its transfer from its stored into its playing position, a tension spring acting on the longer arms of each pair of the said lifting arms adjacent their pivots tending to rotate said longer arms in one upward direction, a horizontal pin on the standard, a pulley revoluble on said pin by the said record playing motor, a cable connecting the shorter arms of the opposing lifting arms to the said pulley acting tension to rotate said longer arms in an opposite downward direction, means actuated by the record playing motor for controlling the tension of said cable and tractional force of the said springs by winding and unwinding the said cable onto and off the said pulley, and means for declutching the said pulley from the record playing motor after the completion of the lifting action and the subsequent playing of the selected record for the return of the latter into its initial position on the turntable.

4. A phonograph record player having a turntable for storing the records in radially upright position, a record selecting, a lifting and a record playing mechanism including a record playing motor, said record playing motor comprising a horizontal shaft having a helically grooved extension in the direction of the record to be played, a standard on the record player mounting the said motor and horizontal shaft, a sleeve member on the said extension closed at its outer end and pointed to form a record receiving pin, means in connection with said shaft extension and said sleeve for moving said record receiving pin toward and away from the record to be played, two pivoted record lifting arms in said lifting mechanism, spring means for rotating said lifting arms into lifting contact with the circumference of the record to be played, a pulley at approximately the upper end of said standard intermediate the two record lifting arms, a cable fixed with its center portion to the said pulley and with its ends to the said lifting arms acting tension against said springs, gear means intermediate the said playing motor and the pulley including a pinion loosely rotatable on an ungrooved part of the said grooved shaft, disconnectible clutch means between said pinion and said sleeve member, a gear wheel on the shaft of said pulley in engagement with the said pinion to wind and unwind the cable for pulling and relaxing the said lifting arms so as to swing them upwardly for lifting the records to be played and downwardly for returning them into their initial position, said gear means comprising means for reversing the direction of rotation of the playing motor for declutching the said pinion from the said sleeve and thereby permitting the return of the lifting arms into their starting position.

5. In a phonograph record player having a magazine for storing the records to be played in radially upright position, a record selecting device, a lifting device and a playing device, said playing device being located centrally above the records on the magazine, a revoluble store plate serving as magazine in approximately the center of the record player, record holders on said store plate for supporting a plurality of records in such star-like position that the prolonged horizontal diameter of each record passes between two records on the opposite side of the store plate, a standard extending upwardly through the centre of the store plate, an inclined guide at the lower end of said standard above the said store plate for leading the selected records from and into their positions on the store plate, a cross piece near the upper end of said standard, two record lifting arms pivoted to the outer ends of said cross piece in diametrically opposite position, means including a motor, a revoluble pulley driven by said motor, a cable intermediate the said pulley and the said lifting arms acting tension to lower one end of said lifting arms, and a spring between the standard and each of the lifting arms acting tension to elevate said one end of said lifting arms for actuating said lifting arms so that first the lifting arm adjacent the selected record contacts with one side of the said record moving it up the said inclined guide, whereupon the other, remote lifting arm contacts with the other side of the said record so that eventually both lifting arms become jointly effective in the final raising of the selected record into its playing position above the other records on the store plate, and means for declutching the said pulley from the said motor shaft to tension said cable to return the lifting arms and the record into their initial position.

6. In a phonograph record player as set forth in claim 5, the provision on the centrally arranged standard of mutually opposing guiding pads below the playing position of the records for preventing the latter from tipping over while being moved into and out of their playing position.

7. In a phonograph record player as set forth in claim 5, the provision on the central standard directly above the apex of the said inclined guide of a pivoted lever in the path of the records to be played, said pivoted lever acting as a switch for the selected records when they are lifted into their raised position and subsequently returned into their initial position on the store plate.

8. In a phonograph record player having a store plate for storing the records in radial star-like position, means for selecting a record to be played, and means for lifting the selected record from one of a pair of diametrically opposite places of said star-like arrangement to a playing position substantially above the other records on the store plate, said lifting means comprising two diametrically opposite lifting members for seizing the selected record at two sides successively first by the member nearest the selected record and thereafter by the member remote from the said record, jointly raising it into playing position and subsequently causing its return into its initial position after playing, and means for imparting a record lifting movement to the said record lifting members and for effecting the return of the record into its initial position on the store plate.

9. A phonograph record player as set forth in claim 8, in which the radial star-like arrangement of the records on the store plate is such that each record is positioned opposite the gap between two records on the other side of the store plate beyond the center point thereof.

10. A multiple record player for moving a selected one of a plurality of records into a playing position, said record player comprising, in combination, a storage magazine having a substantially plane record supporting surface, a plurality of holding means on said supporting surface, each for holding a record in substantially upright position upon said surface, said holding means being radially disposed but circumferentially staggered so that one holding means only is disposed in any diametrical plane, record lifting means mounted above said holding means for lifting records from said holding means into a playing position perpendicular above said magazine, said lifting means including a pair of depending lifting members, both of said members being pivoted in a plane substantially perpendicular to the plane of the supporting surface of the magazine and engageable with a record held in a holding means situated in the plane of the pivotal movement of the respective lifting member, said lifting members depending over substantially diametrically opposite sides of said magazine surface, said magazine and said lifting means being rotatable relative to each other, means for rotating the magazine and the lifting means into a relative rotational position in which the holding means for the selected record is in the plane of the pivotal movement of one of said lifting members; actuating means for pivoting the respective lifting members upwardly to cause lifting of the record in said plane above the records remaining on the magazine, and return means for returning the lifting members into its initial position and the record engaged by said lifting member from its raised position into the holding means from which it had been lifted.

References Cited in the file of this patent

UNITED STATES PATENTS

| | | |
|---|---|---|
| 1,377,027 | Pettit | May 3, 1921 |
| 1,573,504 | Smith | Feb. 16, 1926 |
| 1,968,245 | Bussoz | July 31, 1934 |
| 2,323,365 | Andrews | July 6, 1943 |
| 2,416,436 | Eakins | Feb. 25, 1947 |
| 2,501,391 | Karp | Mar. 21, 1950 |
| 2,557,645 | Fox | June 19, 1951 |
| 2,572,609 | Gierwiatowski | Oct. 23, 1951 |
| 2,594,633 | Freimann et al. | Apr. 29, 1952 |
| 2,616,706 | Maurer | Nov. 4, 1952 |
| 2,658,761 | Morris | Nov. 10, 1953 |

FOREIGN PATENTS

| | | |
|---|---|---|
| 622,000 | Germany | Nov. 22, 1935 |